United States Patent
Fourmaux et al.

(10) Patent No.: US 10,840,667 B2
(45) Date of Patent: Nov. 17, 2020

(54) SYSTEM AND METHOD FOR CORRECTING LASER BEAM WAVEFRONT OF HIGH POWER LASER SYSTEMS

(71) Applicant: INSTITUT NATIONAL DE LA RECHERCHE SCIENTIFIQUE, Quebec (CA)

(72) Inventors: Sylvain Fourmaux, Drummondville (CA); Stéphane Payeur, Montreal (CA); Jean-Claude Kieffer, Montreal (CA)

(73) Assignee: INSTITUT NATIONAL DE LA RECHERCHE SCIENTIFIQUE (CA)

( * ) Notice: Subject to any disclaimer, the term of this patent is extended or adjusted under 35 U.S.C. 154(b) by 0 days.

(21) Appl. No.: 16/204,197

(22) Filed: Nov. 29, 2018

(65) Prior Publication Data

US 2019/0165538 A1    May 30, 2019

Related U.S. Application Data

(60) Provisional application No. 62/592,486, filed on Nov. 30, 2017.

(51) Int. Cl.
*H01S 3/13*       (2006.01)
*H01S 3/00*       (2006.01)
(Continued)

(52) U.S. Cl.
CPC ............ *H01S 3/0071* (2013.01); *G02B 26/06* (2013.01); *G02B 27/0977* (2013.01);
(Continued)

(58) Field of Classification Search
CPC ...... H01S 3/1305; H01S 3/1307; H01S 3/0071
See application file for complete search history.

(56) References Cited

U.S. PATENT DOCUMENTS

2006/0013269 A1* 1/2006 Takahashi ............... G21G 1/12
                                                                  372/9
2010/0265501 A1* 10/2010 Benderskii ........... G01J 3/4338
                                                                  356/307
(Continued)

FOREIGN PATENT DOCUMENTS

WO       2015087007 A1    6/2015

OTHER PUBLICATIONS

International Search Report issued in the corresponding Application PCT/CA2019/050924; dated Aug. 28, 2019.
(Continued)

*Primary Examiner* — Michael Carter
(74) *Attorney, Agent, or Firm* — Lavery, De Billy, LLP; Gwendoline Bruneau

(57) ABSTRACT

A method and a system for laser pulse wavefront correction and focusing optimization for laser Wakefield interaction to accelerate electrons to high energy, and more generally for laser matter interaction where both far field and intermediate field optimization are important, allowing a robust wavefront correction and focusing optimization with a high-power laser system at its nominal laser pulse energy and laser pulse duration. The method comprises, after laser beam focusing by focusing optics, coupling an imaging unit to a wavefront sensor, thereby measuring the laser beam wavefront, and adjusting the measured laser beam wavefront to converge to a reference wavefront of the imaging unit using a spatial phase-modifying device.

20 Claims, 5 Drawing Sheets

(51) Int. Cl.
G02B 27/09 (2006.01)
H01S 3/067 (2006.01)
G02B 26/06 (2006.01)
H01S 3/23 (2006.01)

(52) U.S. Cl.
CPC ............ H01S 3/0085 (2013.01); H01S 3/067 (2013.01); H01S 3/1305 (2013.01); H01S 3/1307 (2013.01); H01S 3/0057 (2013.01); H01S 3/2308 (2013.01)

(56) References Cited

U.S. PATENT DOCUMENTS

2014/0112431 A1    4/2014  Mattson et al.
2015/0092917 A1    4/2015  Roessl
2015/0325977 A1   11/2015  Gu et al.
2017/0068097 A1    3/2017  Honea et al.

OTHER PUBLICATIONS

Bahk, S. W. et al., Generation and Characterization of the Highest Laser Intensities (1022 W/cm2), optics letters 24, 2837(2004).
Druon, F. et al., Wave-Front Correction of Femtosecond Terawatt Lasers by Deformable Mirrors, optics letters 23, 1043 (1998).
Ferri, J. et al., Effect of Experimental Laser Imperfections on Laser Wakefield Acceleration and Betatron Source, Scientific reports 6, 27846 (2016).
Fourmaux, S. et al, Laser Beam Wavefront Correction for Ultra High Intensities with the 200 TW Laser System at the Advanced Laser Light Source, optics express 16, 11987 (2008).
OASys Extrernal Module User Handbook Version 2.2, Deformable Mirror control and Adaptive Optics Loop, Phasics, Jun. 2008.

* cited by examiner

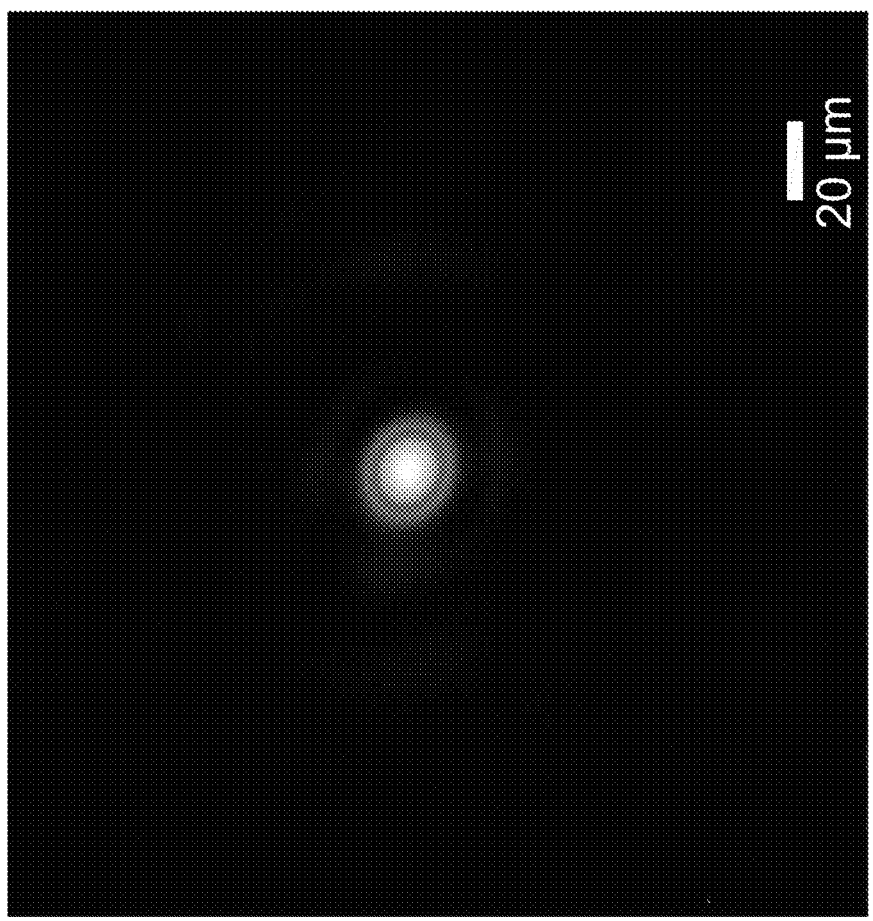
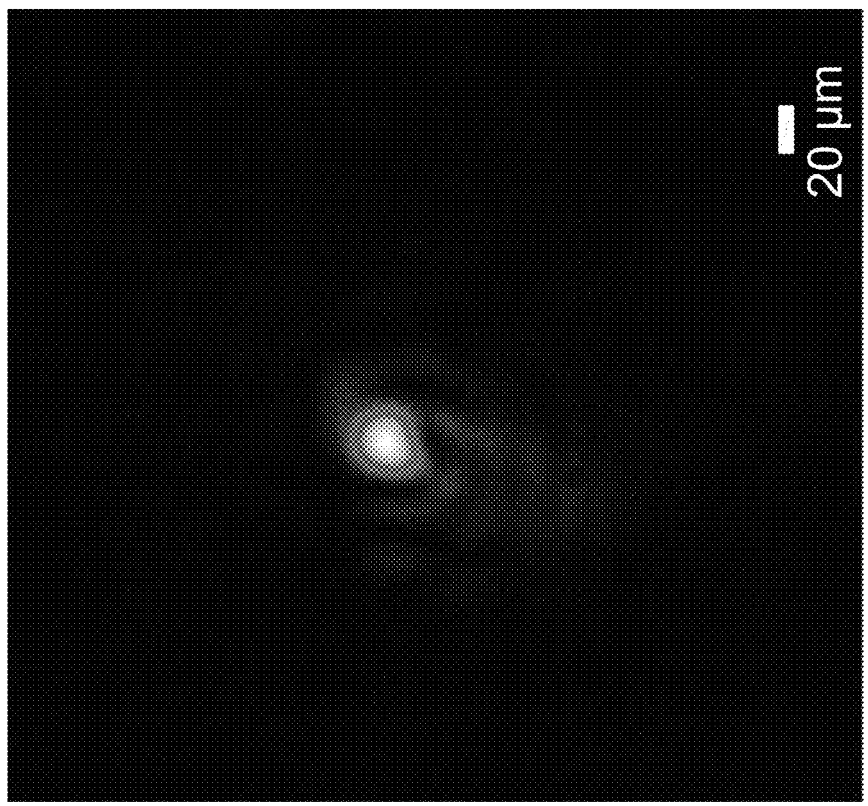
FIG. 5A
FIG. 5B

SYSTEM AND METHOD FOR CORRECTING LASER BEAM WAVEFRONT OF HIGH POWER LASER SYSTEMS

CROSS REFERENCE TO RELATED APPLICATIONS

This application claims benefit of U.S. provisional application Ser. No. 62/592,486, filed on Nov. 30, 2017. All documents above are incorporated herein in their entirety by reference.

FIELD OF THE INVENTION

The present invention relates to high power laser systems. More specifically, the present invention is concerned with a method and a system for correcting laser beam wavefront of high power laser systems.

BACKGROUND OF THE INVENTION

High power laser systems typically comprise a laser system, a compressor optical system, and beam transport and manipulation optics located within a vacuum vessel to avoid nonlinear effects. Such high power laser systems, typically of an energy higher than 100 mJ, pulse duration below 50 fs and peak intensity higher than a few TW for example, are used to produce secondary particles or light sources by focusing a laser beam onto a target using focusing optics. Since the produced high power ultrafast laser pulses exhibit wave-front aberrations, wavefront correction is needed to optimize the focusing of these pulses to reach maximum intensity at a given energy and minimum pulse duration. Moreover, the transport optics, in particular the focusing optics, may introduce extra aberrations that also need to be corrected.

The wavefront correction in a high power laser system is usually achieved by measuring the laser pulse wavefront and correcting the measured laser pulse wavefront to converge toward a reference ideal wavefront. Several methods are used to achieve the laser pulse wavefront measurement and the reference wavefront measurement, using deformable mirrors. These methods operate in specifics geometry and laser conditions, such as low energy versus high energy for example [1, 2].

One such method comprises measuring the laser pulse wavefront behind a mirror leak, then fitting the laser beam diameter to a wavefront sensor pupil using a reducing system, such as an a-focal imaging unit that images the deformable mirror surface. The reference wavefront is produced using the divergent beam from the output of a mono-mode fiber. This reference wavefront is then collimated using a lens and directed to the reducing system after the mirror leak [3]. This method does not take into account the transport optics and the focusing optics located after the mirror leak. It is assumed that these optics do not bring extra aberrations.

Another method comprises measuring the wavefront after the focusing optic in air and at low energy. This may be done by using a wavefront sensor directly after the focus, if the beam is not too divergent, or a simple imaging unit to direct the laser pulse into a wavefront sensor, using a lens and a microscope objective for example. The reference wavefront is produced using the divergent beam from the output of a mono-mode fiber. Once the correction is achieved, the corrected wavefront is measured after a mirror leak using a reducing system to fit the pupil of a second wavefront sensor. This second reference measurement is used for high energy correction [4]. This method thus uses two wavefront sensors or moves a single wavefront sensor from one position to another. The imaging unit is only to be used at low energy and in air; and it is removed after use. For assessing the wavefront correction, the imaging unit needs to be put back in position, which may be time consuming.

Both methods described hereinabove assume that the reference wavefront, the laser alignment, and the reducing system alignment do not change when the laser is set under operation in nominal conditions, thus assuming no attenuation, nominal energy, nominal repetition rate and pulse duration, and the experimental vessels are set under vacuum.

However, it was shown that, when wavefront correction was achieved using the first method described hereinabove for example in case of a laser-produced synchrotron radiation, the wavefront imperfections decreased the energy contained in the useful focal spot by about 50% [5].

Thus, there is still a need in the art for a method and a system for correcting the laser beam wavefront of high power laser systems.

The present description refers to a number of documents, the content of which is herein incorporated by reference in their entirety.

SUMMARY OF THE INVENTION

More specifically, in accordance with the present invention, there is provided a method for correcting the laser beam wavefront of a high power laser system and focusing optimization, comprising, after laser beam focusing by focusing optics, coupling an imaging unit to a wavefront sensor, thereby measuring the laser beam wavefront, and adjusting the measured laser beam wavefront to converge to a reference wavefront of the imaging unit using a spatial phase-modifying device.

There is further provided a system for correcting the laser beam wavefront of a high power laser system and focusing optimization, comprising an imaging unit, after a laser beam focusing optics, coupled to a wavefront sensor measuring the laser beam wavefront, and a spatial phase-modifying device correcting the laser beam wavefront.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 5A shows an experimental focal spot measurement after wavefront correction, at 800 nm with a laser diode inserted in the laser system, measured with a microscope objective directly positioned into the vacuum vessel; and FIG. 5B shows an experimental focal spot measurement after wavefront correction, at 800 nm with a laser diode inserted in the laser system, measured with the imaging unit used for wavefront measurement.

DESCRIPTION OF ILLUSTRATIVE EMBODIMENTS

The present invention is illustrated in further details by the following non-limiting examples.

Figure 1:
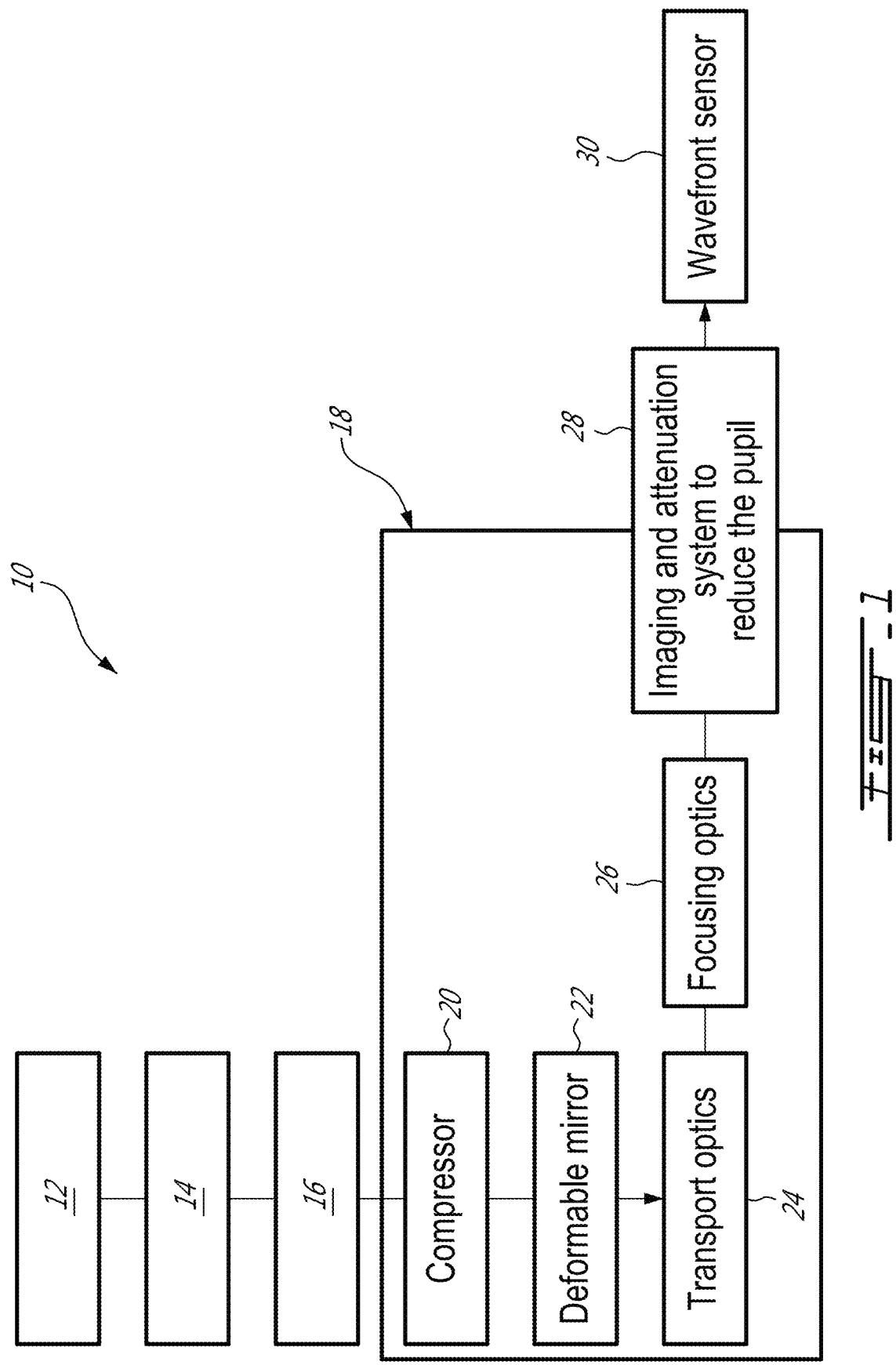
FIG. 1 is a diagrammatic view of high power laser system according to an embodiment of the present disclosure.

The system 10 illustrated in FIG. 1 comprises a laser pulse source 12, a stretcher 14 increasing the pulse duration of the laser pulse received from the laser pulse source 12, and amplification stages 16 in which the laser pulse energy is increased.

Within a vacuum vessel 18 used to avoid nonlinear effects, a compressor 20 reduces the laser pulse duration close to an initial value thereof at the output of the laser pulse source; and a deformable mirror 22 modifies the spatial phase of the laser pulse. Transport optics 24, focusing optics 26 and an imaging and attenuation unit 28 reduce the laser pulse pupil, before measurement of the laser pulse wavefront by a wavefront sensor 30 outside of the vacuum vessel 18.

The unit 28 is used to image the deformable mirror 22 on the wavefront sensor 30. The unit 28 attenuates the laser beam when the laser pulse source 12 is used at its nominal energy with no wavefront distortion, using optical elements such as bare glass wedges or leakage from high reflectivity mirrors in order to avoid B-integral phase shift.

This high-power system illustrated in FIG. 1 may be used to generate laser pulses up to focus where laser matter interaction occurs.

The deformable mirror 22 may be a piezoelectric or a mechanic deformable mirror for instance, or another device modifying the spatial phase of the laser pulse. The transport optics 24 may comprise high reflectivity mirrors. The focusing optics 26 may comprise a parabola or a spherical mirror.

The wavefront sensor 30 may be a Hartmann sensor, a Shack Hartmann sensor or a SID4 sensor for example.

Figure 2:
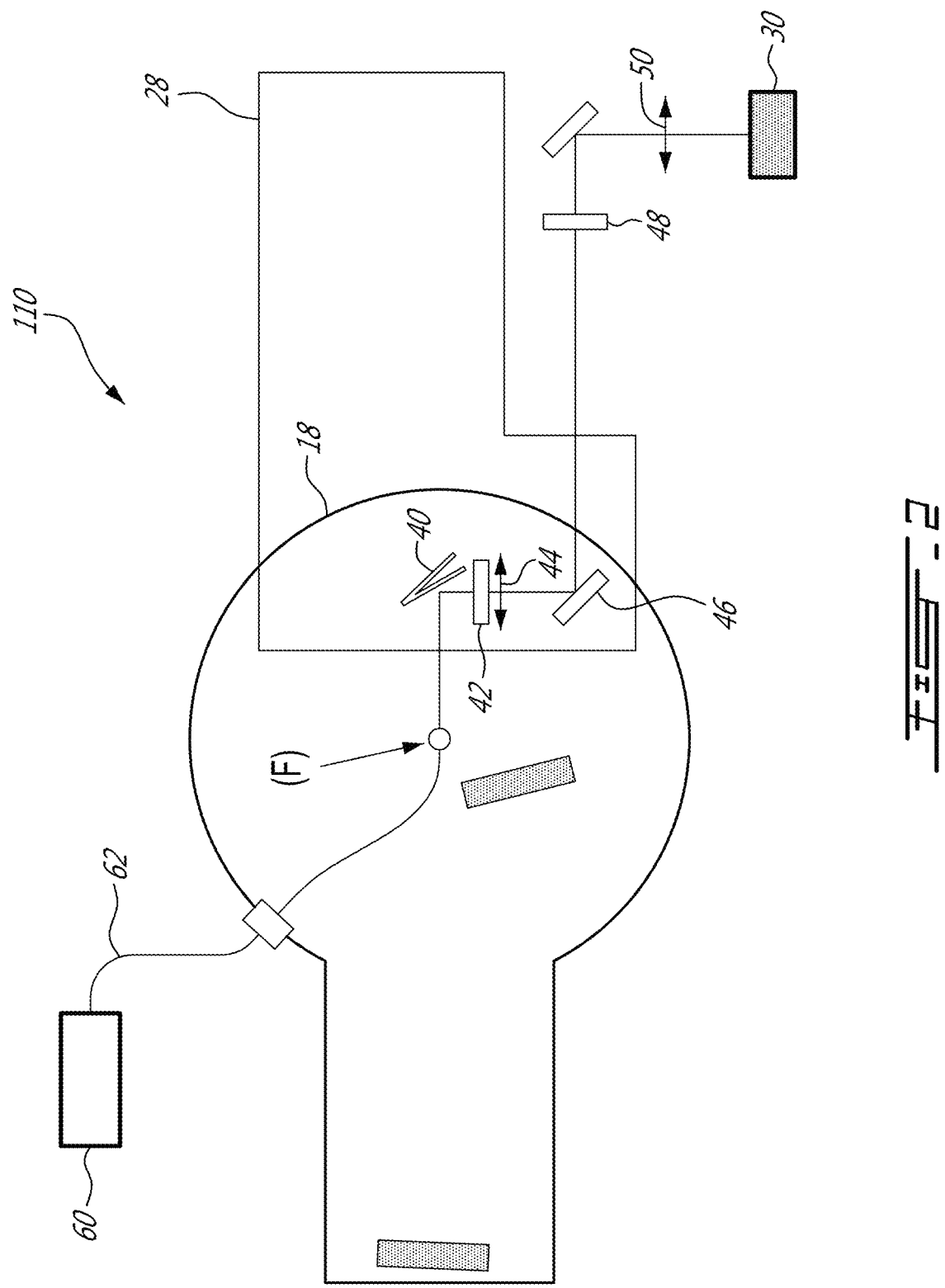
FIG. 2 a schematic view of a system for reference wavefront measurements according to an embodiment of an aspect of the present disclosure.

A system 110 for measurement of a reference wavefront is illustrated for example in FIG. 2. A fiber laser 60 coupled to a mono-mode fiber 62 produces an ideal wavefront, and is inserted inside the vacuum vessel 18 through a fiber feedthrough 64. Within the vacuum vessel 18, a 3 axis translations stage (not shown) is used to position the fiber output at the focus position (F), and then a wedge 40 reflects and attenuates the laser beam energy, received a zero degree incidence high reflectivity dielectric mirror 42 attenuates the laser beam energy, a first lens 44 images the focus position (F) a few meters away, typically in a range between about 2 and 10 m, transports optics 46 such as mirrors and an optical-quality window to direct the laser beam outside the vacuum vessel 18. High reflectivity dielectric mirrors 48, or compensation plates of a thickness equivalent to zero-degree attenuation high reflectivity dielectric mirrors, are used for energy attenuation, and a second lens 50 to image the surface of the deformable mirror 22 onto the surface of the wavefront sensor 30.

Figure 4:
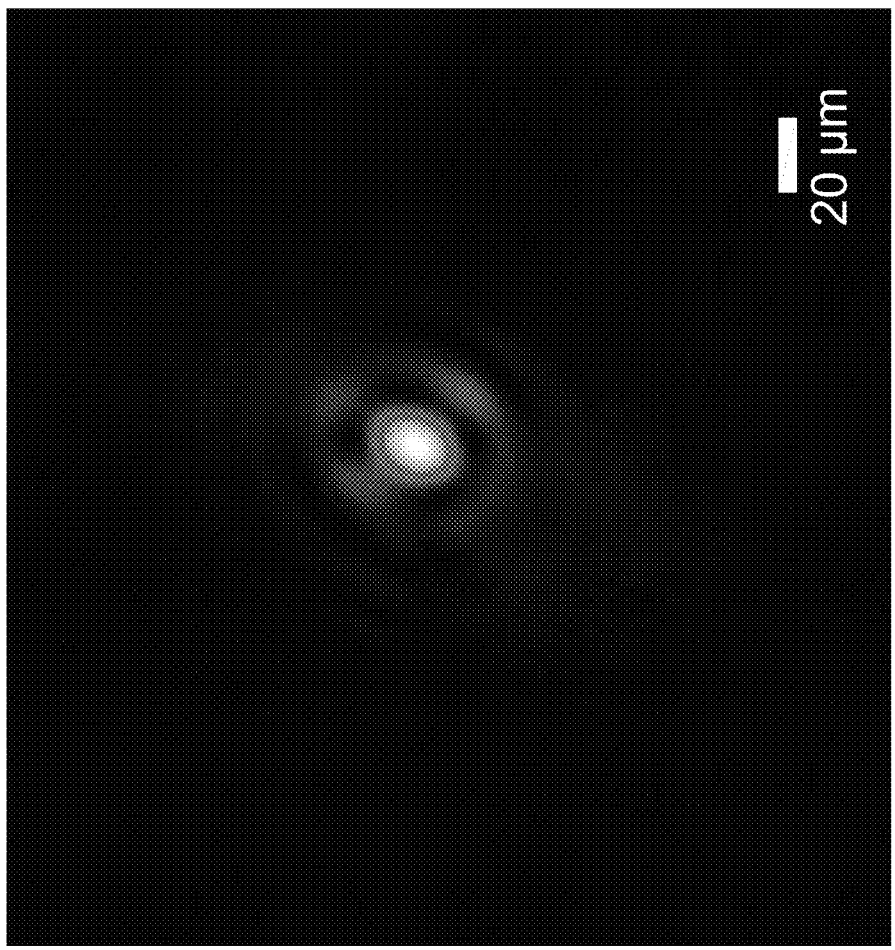
FIG. 4 shows an experimental focal spot measurement at 808 nm corresponding to a reference point source produced with the output of a mono-mode fiber.

FIG. 4 shows experimental measurement of the point source at the output of an 808 nm mono-mode fiber positioned at the focus position (F) of the system of FIG. 2, using a camera in a position selected to image the focus position instead of the wavefront sensor. The image includes the imaging unit aberrations.

Figure 3:
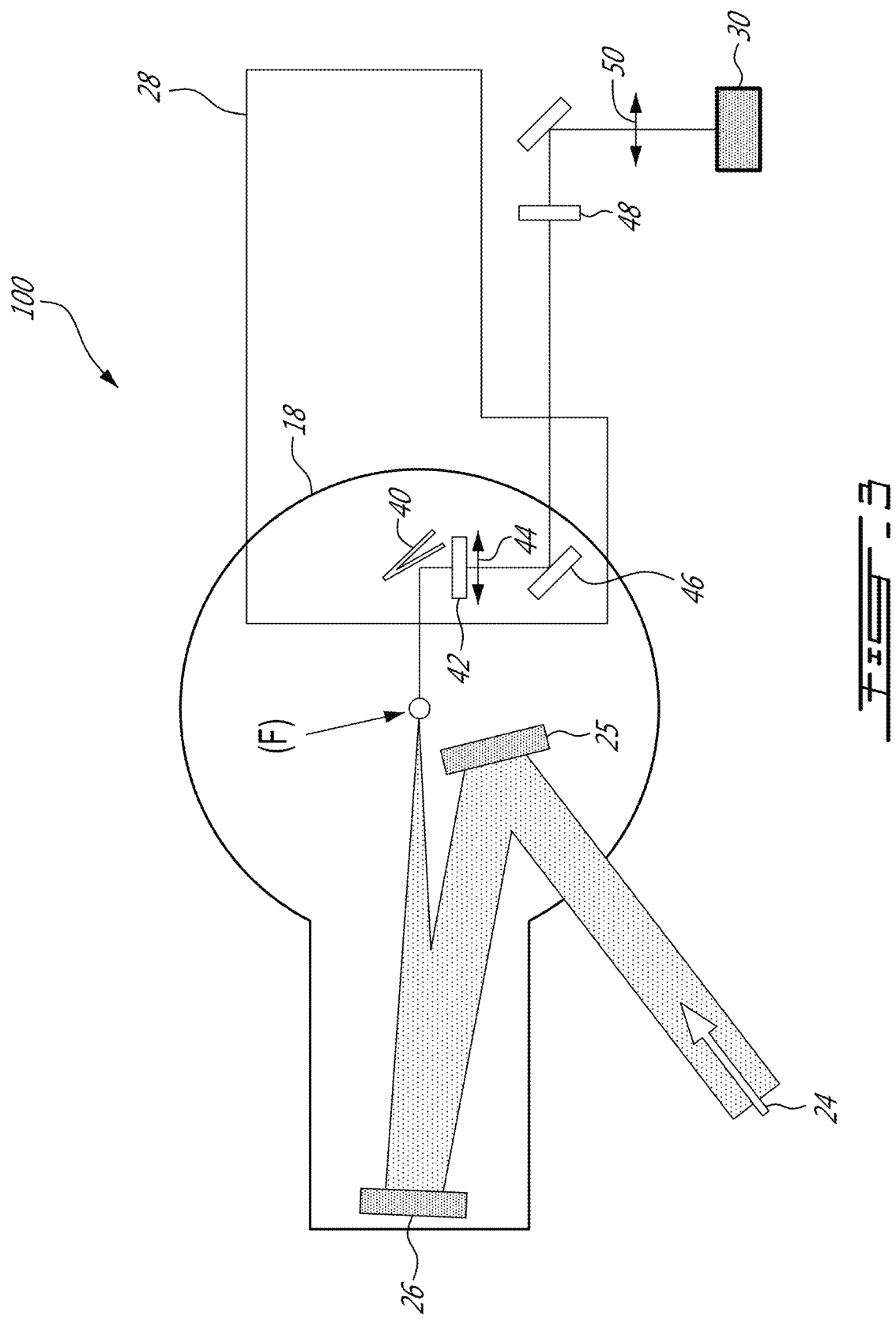
FIG. 3 is a schematic view of a system for wavefront measurement at nominal laser energy according to an embodiment of an aspect of the present disclosure.

A system 100 for focusing and wavefront measurement at nominal laser energy according to an embodiment of an aspect of the present disclosure is illustrated for example in FIG. 3. A high reflectivity mirror 25 reflects the laser pulse onto the focusing optics 26, such as for example a 1.5 m long focal length off axis parabola, to the focus point (F) where the laser pulse is focused. The wedge 40 reflects and attenuates the received laser pulse energy and the zero-degree incidence high reflectivity dielectric mirror 42 attenuates the laser pulse energy, before the first lens 44 images the focus position (F) a few meters away. The transports optics 46, such as mirrors and an optical quality window, direct the laser beam outside the vacuum vessel 18, to the high reflectivity dielectric mirrors or compensation plates 48 that attenuate the laser pulse energy, and the second lens 50 is used to image the deformable mirror 22 surface onto the surface of the wavefront sensor 30

FIG. 5 shows experimental measurement of the off-axis parabola focal spot, using a 800 nm laser diode inserted inside the laser system amplification stages 16, measured after converging toward the reference wavefront as obtained with the system of FIG. 2 using, instead of the wavefront sensor 30, a camera positioned in order to image the focus position (FIG. 5A) and thus including the imaging unit aberrations, and with a microscope objective directly positioned inside the vacuum vessel 18 (FIG. 5B) thus exhibiting negligible aberrations.

The present method and system provide wavefront measurement after focusing optics using an imaging unit compatible with vacuum and with the nominal energy and pulse duration of the laser. The reference wavefront of the imaging unit is measured from a point source positioned at the focusing optics focus or at the output of a mono-mode fiber or light going through a pinhole, thereby allowing flexibility in laser alignment as the reference wavefront pupil may be larger than the laser beam pupil.

Thus, the present imaging unit may be calibrated using, in air or under vacuum, the output of a fiber optics or a pinhole to produce an ideal wavefront at the focus of the position of the laser beam focusing reflective optics. The imaging unit may also be used to image the focus of the laser beam focusing reflective optics to align the calibration source and a target on which the laser beam is focused using a beam splitter for example.

The method allows flexibility in the laser alignment. Indeed, since the reference wavefront pupil may be made larger than the laser beam pupil; what matters is the imaging unit alignment, as opposed to the laser system, transport and focusing optics alignment.

High intensity laser beams are usually focused using an off axis parabola to avoid non-linear effects and large wavefront distortions occurring in transmission optics. The present method may be used with high numerical aperture and on-axis optics, such as on-axis parabola.

The method is usable with the nominal laser parameters, including energy and pulse duration, provided the laser beam is attenuated without introducing any aberrations. When using the imaging unit either with the nominal laser pulse or at low energy for reference measurement, the optical path must remain the same.

The method uses a combination of wedges and high reflectivity dielectric mirrors to attenuate the laser pulse energy. At low energy or when the reference is achieved with a laser diode, high reflectivity dielectric mirrors may be replaced by optical quality compensation plate of identical thickness to avoid changing the beam optical path and the laser pulse wavefront. Optical quality filters may also be used outside the vacuum vessel along the beam path where the beam path is not divergent.

The laser pulse may be imaged using a combination of lenses and/or long or short focal length reflective optics such as off axis parabola or spherical mirror. The imaging optics is used to reduce the beam pupil and fit it inside the wavefront sensor. The imaging optics is used to image the deformable mirror surface onto the wavefront sensor.

The wavefront reference for the imaging unit is produced by a point source located at the focus position. The point source may be produced by the output of a mono-mode fiber connected to a fiber laser or by light going through a pin-hole small enough to produce an ideal spherical wavefront. This reference wavefront takes into account all aberration from the imaging unit. The reference wavefront may be measured under vacuum to avoid alignment error in the imaging unit and refractive index difference between air and vacuum. The reference wavefront may be measured at a wavelength similar to the high-power laser system to yield a same behaviour at the transmission optics interfaces, such as a same lens focal length for example. It may also be achieved at wavelengths different from the high-power laser system to minimise the attenuation from high reflectivity dielectric mirrors.

This method may be extended to high numerical aperture optics and on-axis optics.

There is provided a method and a system for laser pulse wavefront correction and focusing optimization for laser Wakefield interaction to accelerate electrons to high energy, and more generally for laser matter interaction where both far field and intermediate field optimization are important. More specifically, there is provided a method and system to achieve a robust wavefront correction and focusing optimization with a high-power laser system at its nominal laser pulse energy and laser pulse duration.

The scope of the claims should not be limited by the embodiments set forth in the examples but should be given the broadest interpretation consistent with the description as a whole.

The invention claimed is:

1. A method for correcting the laser beam wavefront of a high power laser system and focusing optimization, comprising attenuating the laser beam energy using at least one of wedges and high reflectivity dielectric mirrors; focusing by focusing optics, measuring the laser beam wavefront using a wavefront sensor coupled to an imaging unit, and adjusting the measured laser beam wavefront to converge to a reference wavefront of a reference beam of the imaging unit using a spatial phase-modifying device, the method comprising controlling the reference beam divergence to be larger than the laser beam divergence.

2. The method of claim 1, wherein the focusing optics have a focus position for the laser beam, the method comprising measuring the reference wavefront of the imaging unit from a point source positioned at the focus position.

3. The method of claim 1, comprising producing a point source one of: i) the output of a mono-mode fibre connected to a laser and ii) light going through a pin-hole and yielding an ideal spherical wavefront; and measuring the reference wavefront of the imaging unit from the point source.

4. The method of claim 1, comprising producing a point source by one of: i) the output of a mono-mode fiber connected to a laser and ii) light going through a pin-hole and yielding an ideal spherical wavefront; and measuring the reference wavefront of the imaging unit from the point source at a wavelength of the high-power laser system.

5. The method of claim 1, comprising producing a point source by one of: i) the output of a mono-mode fiber connected to a laser and ii) light going through a pin-hole and yielding an ideal spherical wavefront; and measuring the reference wavefront of the imaging unit from the point source at a wavelength different than a wavelength of the high-power laser system.

6. The method of claim 1, comprising producing a point source by one of: i) the output of a mono-mode fiber connected to a laser and ii) light going through a pin-hole and yielding an ideal spherical wavefront; and measuring the reference wavefront of the imaging unit from the point source under vacuum.

7. The method of claim 1, wherein said laser beam focusing comprises using reflective optics.

8. The method of claim 1, wherein said laser beam focusing comprises using at least one of: i) an off-axis parabola and ii) a spherical mirror.

9. The method of claim 1, comprising using an on-axis parabola.

10. The method of claim 1, comprising using one of: i) a long focal length reflective focusing optics and ii) a short reflective focusing optics.

11. The method of claim 1, comprising imaging the spatial phase-modifying device on the wavefront sensor by the imaging unit.

12. The method of claim 1, wherein the wavefront sensor is one of: a Hartmann sensor, a Shack Hartmann sensor and a SID4 sensor.

13. The method of claim 1, wherein the spatial phase-modifying device is a deformable mirror.

14. The method of claim 1, comprising attenuating the laser beam when the laser system is used at a nominal energy thereof in absence of wavefront distortion.

15. The method of claim 1, comprising calibrating the imaging unit using one of: i) the output of a fiber optics and ii) a pinhole selected to produce an ideal spherical reference wavefront at a focus position of the laser beam focusing optics.

16. The method of claim 1, further comprising imaging the focus of laser beam focusing optics to align a calibration source and a target on which the laser beam is focused.

17. A system for correcting the laser beam wavefront of a high power laser system and focusing optimization, comprising a spatial phase-modifying device, focusing optics, a laser beam attenuation unit, and a wavefront sensor coupled to an imaging unit, said laser beam attenuation unit comprising at least one of bare glass wedges and high reflectivity dielectric mirrors, said laser beam attenuation unit attenuating the laser beam energy before focusing by said focusing optics, said wavefront sensor measuring the laser beam wavefront; said spatial phase-modifying device adjusting the measured laser beam wavefront to converge to a reference wavefront of a reference beam of the imaging unit, the reference beam divergence being larger than the laser beam divergence.

18. The system of claim 17, wherein said imaging unit comprises attenuation optical elements, said attenuation optical elements attenuating the laser beam when the laser system is used at a nominal energy thereof in absence of wavefront distortion.

19. The system of claim 17, wherein said laser beam focusing optics comprises at least one of: i) a parabola and ii) a spherical mirror.

20. The system of claim 17, wherein said spatial phase-modifying device is a deformable mirror.

* * * * *